March 28, 1939.  H. F. GODWIN ET AL  2,152,252
LAWN MOWER
Filed Feb. 15, 1936  2 Sheets-Sheet 1
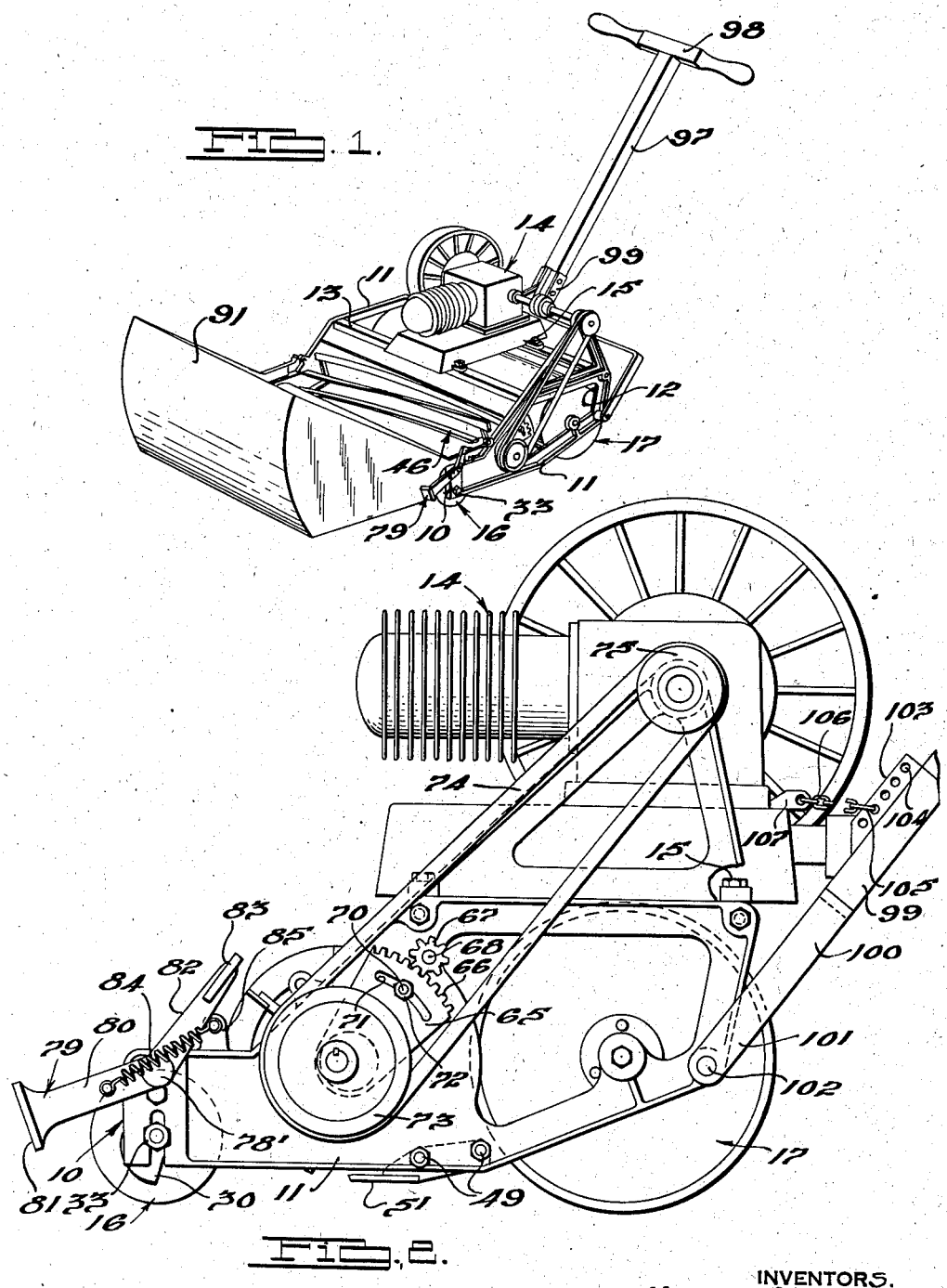

March 28, 1939. H. F. GODWIN ET AL 2,152,252
LAWN MOWER
Filed Feb. 15, 1936  2 Sheets-Sheet 2
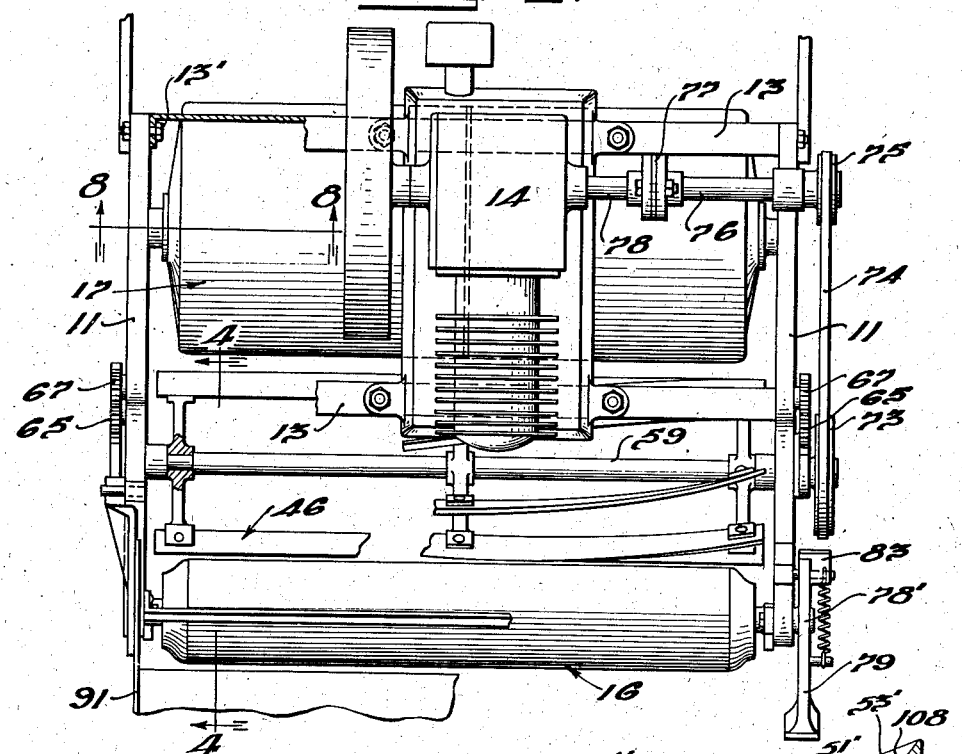
INVENTORS.
Hiram F. Godwin.
Frank C. Speke.
BY
Robert E. Harris
ATTORNEY Patented Mar. 28, 1939

2,152,252

UNITED STATES PATENT OFFICE 2,152,252

LAWN MOWER

Hiram F. Godwin, Detroit, Mich., and Frank C. Speke, Toledo, Ohio

Application February 15, 1936, Serial No. 64,000

15 Claims. (Cl. 56—26)

This invention relates to improvements in lawn mowers.

More particularly the invention pertains to improved lawn mowers of the character employed for cutting bent grass although many of the improvements herein set forth may be utilized to advantage in the construction and operation of lawn mowers for general grass cutting service.

The improved lawn mower in brief comprises a frame structure on which is mounted a fixed knife blade and an associated rotatable cutting reel having a plurality of helical blades. The reel is adapted to be rotated independently of the translatory movement of the mower by suitable driving mechanism mounted on the frame and the latter is movably supported on front and rear rollers, one disposed in advance of and the other rearwardly of the reel and cutting knife.

Bent grass has a matted, moss-like intertwined texture which greatly complicates the problems involved in its cutting, particularly when complying with the extremely high standards of uniformity and plush-like evenness demanded in the keeping of golf course greens, for example. Frequent cuts per unit of distance of travel of a lawn mower are required to prevent corrugated and wave-like unevenness due to chopping of the grass at spaced intervals and for this reason the cutting reel includes a large number of blades and is preferably power driven, while the lawn mower itself may be manually or power propelled. Accurate cutting adjustments between all portions of the blades of the cutting reel and the fixed knife must be maintained without variation from distortion or vibration of the structure of the mower and hence there should be provided sufficient rigidity to withstand vibrations and reactions of the reel driving apparatus as well as the other forces that are inherent in the operation and manipulation of a device of this kind.

Rigidity and precision of adjustment cannot be obtained at the sacrifice of weight limitation for mowers of excessive weight are not only tiresome to operate but they so compress the grass in advance of the cutting elements as to render close and even cutting thereof impossible. An improper distribution of weight between the front and rear rollers of a mower, or application of a component of manual or power driven manipulating forces in an incorrect direction likewise result in excessive compression of the grass immediately prior to cutting thereof.

One of the main objects of this invention is to provide an improved lawn mower which has structural and operative parts so constructed and arranged as to obtain the strength and rigidity required to maintain a device of this character in accurate adjustment for close and even cutting operation while limiting the total weight of the mower to such an extent that it may be manipulated with comparative little effort and without excessively compressing the grass in advance of the cutting parts.

Another object of the invention is to provide a mower of this character in which the cutting reel is adjustable and which has a rigidly fixed cutting knife and knife bed capable of serving as one of the main transverse reinforcing and rigidity imparting elements of the mower frame structure.

A further object of the invention is to provide improved apparatus by which the cutting reel and the blades thereof may be adjusted throughout their entire lengths with accurate precision and by a single operation with respect to the fixed knife.

A further object of this invention is to so distribute the weight of a lawn mower of this kind as to limit and predetermine the amount of compression to which the grass immediately in advance of the cutting elements is subjected.

A still further object of the invention is to provide improved means for adjusting the front roller of the lawn mower for predetermining the closeness of the cutting operation and by which one or either end of the mower may be independently adjusted or both ends thereof may be simultaneously varied with respect to the mower frame and with accurate precision.

Another object of the invention is to provide an improved manipulating handle which is so pivotally associated with the frame structure of the mower as to guard against the application during normal operation thereof of a manually applied propelling or manipulating force component in such a direction as to urge the front roller and related cutting elements downwardly to an extent such that excessive compression of the grass or variation of the cut will occur.

Additional objects of the invention are to provide an improved rest, which may be conveniently moved into position by the foot of an operator, for holding the front roller and cutting elements above the surface of the grass so that the reel will be allowed to continue operation while unattended without cutting a groove in the lawn surface; to provide means for normally holding said rest in an inoperative position and which is adapted to automatically return the rest to its inoperative position after use when the mower is moved slightly rearwardly; to provide an improved rear roller and mounting therefor which accommodates removal of the rear roller from the frame structure without requiring disassembly of the latter; to provide an improved knife bed and knife having an arcuate surface corresponding with the arcuate path of the cutting edges of the blades of the reel and which is reversible in position to accommodate the utilization of both of its longitudinal edges for cutting purposes.

The above being among the objects of the present invention, the same consists in certain novel features of construction and combination of parts to be hereinafter described with reference to the accompanying drawings and then claimed, having the above and other objects in view.

An illustrative embodiment of the invention is shown in the accompanying drawings, in which:

Fig. 1 is a perspective view of a lawn mower embodying the invention.

Fig. 2 is a fragmentary side elevational view of the lawn mower illustrated in Fig. 1, showing portions of the structure somewhat in detail.

Fig. 3 is a top plan view of the lawn mower shown in Figs. 1 and 2.

Fig. 4 is a fragmentary longitudinal sectional view taken on the line 4—4 of Fig. 3.

Fig. 5 is a transverse sectional view taken on the line 5—5 of Fig. 4.

Fig. 6 is a transverse sectional view taken on the line 6—6 of Fig. 4.

Fig. 7 is a fragmentary sectional view taken longitudinally of the lawn mower on line 7—7 of Fig. 6.

Fig. 8 is a fragmentary transverse sectional view taken on the line 8—8 of Fig. 3.

Fig. 9 is a fragmentary transverse sectional view of a knife and knife bed embodying a modified form of the invention.

In the form of the invention illustrated in the drawings the improved lawn mower comprises a frame structure, generally designated by the numeral 10, having spaced side members 11 preferably comprising castings formed of aluminum or other suitable casting metal or alloy. The side members 11 also preferably have an open central portion 12 for reducing the weight, and angular marginal portions surrounding the opening for providing rigidity. The spaced side members 11 are connected by transverse bars 13 preferably of angle section and which are secured thereto by bolts 13', as illustrated in Fig. 3. These bars 13 are preferably located at the upper extremity of the rear end portion of the mower frame 10 and are utilized to support a driving member, generally designated by the numeral 14, which is detachably secured to the bars by bolts 15. Other transverse reinforcing elements may be employed at diverse locations on the frame if required, but in general substantially all of the remaining transverse rigidity is derived from parts of the operating mechanism hereinafter set forth, which serves the added function of reinforcing the frame.

The lawn mower frame 10 is translatably supported on front and rear rollers 16 and 17 respectively which are interposed between corresponding portions of the side frame elements 11. The front roller 16, as shown in Fig. 6, comprises a hollow drum 18 having a tubular intermediate portion and end bearing elements 19 in which is disposed an outer bearing race member 20 of a bearing having a series of rolling contact elements 21 and an inner bearing race 22. The inner bearing race of each end of the front roller 16 is non-rotatably mounted on a hub 23 having a radial flange 24 provided with a peripheral portion 25 of partial circular curvature and which is eccentrically located with respect to the axis of the hub 23. The hub 23 of each end of the roller 16 is provided with a central passage or bore through which a shaft 27 extends. Each hub and the shaft are non-rotatably fixed together by a pin 28 which extends through registering openings therein. The opposite end portions of the shaft 27 project beyond the radial flange 24 of the hubs 23 and are received in vertical slots 29 formed in the opposite side elements 11 of the frame structure. These slots are provided with open end portions 30 for accommodating insertion of the end portions of the shaft 27 therethrough and retraction of such shaft end portions therefrom. One end of the shaft 27 is threaded and provided with an operating handle 31 detachably secured to the shaft by a bolt 32, and the other end portion of the shaft is similarly provided with a bolt 33, as illustrated in Fig. 1. Upward movement of the roller 16 relative to the frame structure and corresponding movement of end portions of the shaft 27 in their respective slots 29 of the frame is predetermined by adjustable stops mounted on the side elements 11. Each stop comprises, as illustrated in Fig. 6, a bolt 34 having a rectangular shank portion 35 adjacent its head end on which is non-rotatably mounted a cam 36. The cam 36 has a periphery which contacts with the periphery 25 of the flange 24 of the hub 23. The bolts 34 extend through apertures in the frame side elements 11 and are provided with nuts 37 by which the cams 36 may be rigidly held in a selected position. These cams may be adjusted independently of each other by releasing their respective nuts 37 and turning the cams about the axes of the bolts by engaging a suitable tool on the heads of the latter. Such adjustments independently vary the position of the respective end portions of the roller 16 with respect to the frame structure. The opposite end portions of the roller 16 may be simultaneously varied throughout equal distances relative to the frame structure by allowing the cams 36 to remain fixed and turning the hubs 23 relative thereto by operation of the handle 31 after releasing the bolts 32 on the ends of the shaft 27. Naturally, only one adjustable stop is required to facilitate the combination of independent and simultaneous adjustment of the ends of the front roller 16. The transversely extending shaft 27 is so fixed, in order to hold the roller in adjusted position, to the side elements 11 of the frame structure as to impart thereto substantial rigidity at the front end of the frame during normal operation of the mower.

The rear roller 17 comprises two independently rotatable cylindrical roller sections 38, each of which has spaced end closures 39, preferably formed of sheet metal, on which are mounted outwardly extending bearing housings 40 having rolling contact elements 41 therein for rotatably supporting the roller sections 38 on a transversely extending shaft 42. The opposite extremities of the shaft 42 are disposed adjacent the inner side faces 43 of opposite side elements 11 of the frame structure and they are rigidly clamped thereto by bolts 44 extending through apertures in the frame and threaded in apertures 45 formed in the extremities of the shaft 42 and have head portions engaged against the external sides of the side frame elements. The rear roller 17 may be removed from the frame structure by unscrewing and withdrawing the bolts 44 and separating both sections of the roller together with the shaft 42 from the frame structure. The bolts 44 maintain the shaft 42 in clamped relation to the side elements 11 of the frame structure and thereby condition the shaft to serve as a transverse reinforcing element of the frame.

The cutting apparatus, generally designated by the numeral 46 and illustrated in section in Fig. 5, includes a transversely extending knife bed 47, preferably comprising a casting, which extends transversely between the side frame elements 11 and which is provided with upstanding end flanges 48 that are detachably fixed to the side frame elements by bolts 49. Formed in the lower forward portion of the knife bed 47 is a recess 50 in which a knife 51 is seated. The knife 51 is detachably secured to the knife bed 47 by screws 52 having head portions countersunk in the knife. Formed on the front longitudinal extremity of the knife 51 is a cutting edge 53 which is located in cooperative relationship with respect to the path of a plurality of helical blades 54 carried by a reel 55 which is rotatably mounted on the frame structure. The reel 55 includes a pair of apertured hubs 56 having outwardly extending spokes 57 thereon for supporting the blades 54. Each hub 56 is non-rotatably fixed to one of the opposite reduced end portions 58 of a shaft 59, as illustrated in Fig. 5. Each of the reduced end portions 58 of the shaft 59 is journaled in bushings 60 carried by a bearing member 61 rotatably mounted in an opening 62 formed in one of the side elements 11 respectively of the frame structure. The outer ends of the shaft 59 are threaded and provided with nuts 59'. The bearing 61 has an integral hub portion provided with a cylindrical bore 63 which is concentric with the shaft 59 and bushing 60 for receiving the latter, whereas the hub portion of the bearing member has a cylindrical peripheral portion 64 which is eccentric with respect to the axis of the bore 63 and which has a close fitting relationship with the wall of the opening 62, which in turn is also eccentric with respect to the axis of the shaft 59.

By virtue of the eccentric relationship between the rotative mounting for the bearing members 61 and the axis of the shaft 59 the latter and the cutting reel 55 carried thereby may be varied in position by rotating the bearing members 61 relative to the side elements of the frame structure in which they are mounted. The direction of movement provided for by the eccentric mounting of the bearing members is predetermined to properly adjustably position the outer end portions of the blades with respect to the cutting edge 53 of the knife 51.

In order to provide for simultaneous and equal adjustments of both ends of the cutting reel with respect to the cutting edge of the knife 51, each bearing element 61 is provided with a gear segment 65, preferably formed integral with the bearing elements and having teeth 66 meshed with the teeth of a pinion 67. The pinions 67 are non-rotatably fixed to a transversely extending shaft 68 journaled in registering apertures in the opposite side elements of the frame structure, as illustrated in Fig. 5. The shaft 68 is provided with a transversely extending slot 69 in which a pin or other suitable tool may be engaged for conveniently turning the shaft 69 so as to simultaneously adjust both end portions of the reel throughout equal distances by a single operation. Each end of the reel 55 may be securely held in an adjusted position by a bolt 70 extending through an aperture in the side element of the frame with which it is associated and through an arcuate slot 71 formed in the corresponding gear segment 65. The bolts 70 are provided with conveniently accessible nuts 72 by which the gear segments are releasably clamped to the outer side faces of the side elements.

The right end portion of the shaft 59 of the cutting reel extends outwardly beyond the associated side frame element 11 and is provided with a pulley 73 which is drivenly connected by a belt 74 with a pulley 75 fixed to a shaft 76 which is in turn connected, preferably by a flexible coupling 77, with the drive shaft 78 of the driving member 14, illustrated in the drawings as an internal combustion engine.

Pivotally mounted at 78' on the front end portion of the right side frame member 11, as illustrated in Fig. 3, is a rest 79 comprising a bell crank having a downwardly extending arm 80 having a ground engaging base 81 at its outer extremity and a upwardly extending arm 82 provided with a pedal 83 on its upper extremity conveniently engageable by the foot of an operator. The rest 79 is normally held in inoperative position by a coil spring 84 having one end attached to the arm 80 of the bell crank and having its opposite end fixed to a bracket 85 carried by the associated side frame member 11.

Immediately rearwardly of the cutting reel 55 is an arcuate shield 86 which is removably insertible between pins 87 extending inwardly from the opposite side members 11 and the lower front edge portion 88 of the front transverse frame member 13, as illustrated in Fig. 4. The lower edge portion of the shield 86 is receivable in a notch 89 formed in the knife bed 47. The shield has a flange 90 along its upper longitudinal edge portion by which it may be conveniently gripped and readily removed for cleaning or other purposes, and it is adapted to prevent the throwing of cut grass rearwardly from the rotating cutting reel. The shield 86 directs the cut grass upwardly and forwardly causing the same to be discharged into a hopper 91 mounted in advance of the front roller 16. The hopper 91 has rearwardly extending arms 92 provided with flat edges 93 which are adapted to seat against upper edge portions of the side elements 11 of the frame structure, and the rear extremities of the arms 92 are provided with open, semi-cylindrical hubs 94 that are engageable beneath pins 95 carried by brackets 96 which extend upwardly from the front end portion of the frame side elements 11. As illustrated in the drawings, the open part 11 of the frame side members terminates rearwardly of the shield 86 and rear path of the cutting reel blades and from this location forwardly the frame side elements are substantially solid so as to provide the required rigidity for the cutting apparatus and other parts of the structure associated therewith, as well as to close the ends of the compartment in which the reel operates.

The improved mower is provided with an operating handle having a shaft 97 and a cross bar 98 at its upper end. The lower end of the shaft 97 is received in a socket 99 of a yoke 100 which has spaced side members 101 pivotally attached to the side elements 11 at 102. The pivotal attachment of the side members 101 of the yoke 100 to the frame structure is made at a location rearwardly of the axis of the rear roller 17 in order to guard against the application on the frame of downwardly directed forces tending to urge the front roller downwardly in a direction to compress the grass in advance of the cutting apparatus. The socket 99, which preferably comprises sheet metal, is provided with an outwardly extending flange 103 having a series of spaced apertures 104 therein in which a hook 105 on end of a chain 106 is selectively engageable. The other end of the chain 106 is attached to a bracket 107 carried by the frame structure or part of the apparatus mounted thereon in order to limit downward pivotal movement of the operating handle about its pivots 102. The operating handle is free to rotate in a counterclockwise direction, as viewed in Fig. 2, during operation of the mower in order to guard against the application of components of manually applied force in such a direction as to urge the front roller and cutting apparatus downwardly toward the ground surface.

In Fig. 9 there is illustrated a modified cutting knife and knife bed employing a further development of the invention. The knife bed designated by the numeral 47' may be mounted in the same manner and at substantially the same location as the knife bed 47 shown in Fig. 4. In this form of the invention the knife bed 47' comprises a casting of generally angular cross section having an upper arcuate surface 108 extending generally at an inclination with respect to a horizontal plane. Removably mounted on the inclined arcuate face 108 is an arcuate knife blade 51' having a curvature corresponding with the curvature of the face or seat 108. Both the curvature of the seat and blade correspond properly with the curvature of the cutting edges of the blades of the reel so as to properly position the cutting edge 53' of the blade 51' as well as to deflect the travel of the cut portions of the grass upwardly toward the hopper of the mower. The blade 51' has cutting edges 53' on both of its longitudinal extremities and therefore may be reversed in position to facilitate prolonged use of the knife without frequent sharpening. The generally smooth and sweeping curvature of the blade 51' and seat 108 prevent accumulation and lodging of cut grass in the vicinity of the cutting edge of the knife.

All parts of the improved lawn mower are constructed and arranged as to distribute their weight in a predetermined manner in order to maintain compression to which grass in advance of the cutting apparatus is subjected at a selected value. This is accomplished by properly locating the driving mechanism so that its center of mass is preferably located rearwardly of the axis of the rear roller thereby counterbalancing, to an extent, the weight of the forwardly located parts of the mower. The parts of the frame structure are so constructed and arranged that they may comprise light metal such as aluminum or suitable alloys. Portions of the operating apparatus and supports therefor are so constructed and arranged as to serve the additional function of rigidifying the frame thereby enabling the successful use of a relative light weight structure for frame purposes.

The precision with which all portions of the length of the cutting reel may be adjusted with respect to the cutting blade enables operation of the cutting reel at a relatively high rate of speed in order to effect a corresponding large number of cuts per unit of travel of the mower without endangering the knife or blades of the cutting reel for these parts of the cutting apparatus may be accurately brought into close acting relationship with respect to each other by a single operation requiring no more skill than that possessed by the average operator of devices of this character.

The depth of the cut can likewise be predetermined by one having only ordinary knowledge and skill of machinery for the adjustment of the front roller by which the depth of the cut is controlled is a simple one. The individual adjustability of the respectively opposite ends of the front roller as well as the simultaneous adjustment of the ends thereof facilitates convenient placement of the cutting apparatus so that throughout the entire length thereof corresponding blades of grass will be cut at substantially the same distance from their roots.

When it is desired to leave the mower unattended while the cutting reel is rotating it is merely necessary for the operator to bear downwardly on the operating handle in order to elevate the front roller and cutting apparatus and to rotate the rest 79 in a counterclockwise direction, as viewed in Fig. 2, by foot pressure until the lower arm 80 is disposed substantially vertically. The handle then may be released and the cutting apparatus be held above the tops of the blades of grass to prevent the cutting of a groove in the surface of the grass. Slight rearward movement of the mower from its at rest position will initially turn the rest in a clockwise direction until it has become disengaged from the ground whereupon the spring 84 will return it to the full line inoperative position shown in Fig. 2.

Although but several specific embodiments of the invention are herein shown and described, it will be understood that various changes in the size, shape and arrangement of parts may be made without departing from the spirit of our invention.

What we claim is:

1. In a lawn mower comprising a frame structure and having a knife fixed thereon; adjustable cutting mechanism including spaced bearing members, each having an outer peripheral portion journaled in an opening of one pair of opposite sides of said frame respectively, each of said members having an internal bearing surface eccentrically located with respect to its outer peripheral portion, a cutting reel comprising a shaft having opposite end portions journaled in said internal bearing surfaces, said reel being adjustable toward and away from said knife by rotation of said bearing members relative to said frame structure, and means for positively adjusting said reel including an element for rotating each of said bearing members respectively and having a common manually operable actuating element positively connecting said bearing rotating elements for simultaneously rotating said bearing members and moving the opposite end portions of said reel in unison and throughout substantially equal distances.

2. In a lawn mower including a frame structure and having cutting means operatively mounted thereon; apparatus for movably supporting said frame structure including an adjustable roller for supporting an end of said frame structure and maintaining said cutting means in predetermined spaced relation to the ground surface during operation of said mower, an adjustable roller mounting member rotatably and shiftably supporting each opposite end portion of said roller respectively in said frame structure, and means for simultaneously varying the positions of the opposite end portions of said roller including adjusting apparatus having positively connected actuating elements for acting upon each of said roller mounting members respectively for simultaneously moving all portions of said rollers substantially equal distances with respect to said structure.

3. In a lawn mower including a frame structure and having cutting means operatively mounted thereon; apparatus for movably supporting said frame structure including an adjustable roller for sustaining the weight of an end of said frame structure and maintaining said cutting means in predetermined spaced relation to the ground surface during operation of said mower, said roller having opposite end portions shiftably and rotatably mounted in said frame structure, roller adjusting mechanism having interconnected elements one acting upon each end portion of said roller respectively for simultaneously varying the positions of the opposite end portions of said roller substantially equal distances with respect to said structure, and an adjustable member for acting upon one end portion of said roller for varying the portion of said latter end portion of said roller with respect to said frame structure independently of the other end portion of said roller.

4. In a lawn mower including a frame structure and having cutting means operatively mounted thereon; apparatus for movably supporting said frame structure including spaced ground engaging means on said frame structure, one of said ground engaging means comprising an adjustable roller for sustaining the weight of an end of said frame structure and maintaining said cutting means in predetermined spaced relation to the ground surface during operation of said mower, means for shiftably and rotatably mounting opposite end portions of said roller on said frame structure including a variable stop carried by each end portion of said roller respectively, abutments on said frame structure engageable with said stops, and stop adjusting mechanism having interconnected members, one operatively connected with each stop respectively for simultaneously varying the positions of the latter substantially equal and corresponding amounts so as to produce equal and corresponding adjustments of opposite end portions of said roller relative to said frame structure.

5. In a lawn mower including a frame structure and having cutting means operatively mounted thereon; apparatus for movably supporting said frame structure including spaced ground engaging means on said frame structure, one of said ground engaging means comprising an adjustable roller for sustaining the weight of an end of said frame structure and maintaining said cutting means in predetermined spaced relation to the ground surface during operation of said mower, means for shiftably and rotatably mounting opposite end portions of said roller on said frame structure including a variable stop associated with each end portion of said roller respectively, abutments on said frame structure engageable with said stops, and stop adjusting mechanism including positively connected members, one for acting upon each of said stops respectively to simultaneously vary the latter substantially equal and corresponding amounts so as to produce equal and corresponding adjustments of opposite end portions of said roller relative to said frame structure, one of said abutments being adjustable relative to said frame structure for effecting adjustment of one of the end portions of said roller independently of the other end portion thereof.

6. In a lawn mower including a frame structure and having cutting means operatively mounted thereon; said lawn mower including spaced ground engaging means on said frame structure, one of said ground engaging means comprising an adjustable roller for sustaining the weight of an end of said frame structure and maintaining said cutting means in predetermined spaced relation to the ground surface during operation of said mower; roller mounting apparatus for rotatably and shiftably mounting said roller on said frame structure including a hub element associated with each end of said roller respectively and having a member non-rotatably interconnecting said hub elements and shiftably and rotatably supporting the latter on said frame structure, each hub element having an outwardly extending flange provided with a cam surface, and abutments on said frame structure engagable with said cam surfaces for positively urging said frame structure upwardly during rotation of said hub elements and the flanges thereof in one direction and for limiting movement of said frame structure relative to said roller during rotation of said hub elements in an opposite direction.

7. In a lawn mower including a frame structure and having cutting means operatively mounted thereon; apparatus for movably suporting said frame structure including spaced ground engaging means on said frame structure, one of said ground engaging means comprising an adjustable roller for sustaining the weight of an end of said frame structure and maintaining said cutting means in predetermined spaced relation to the ground surface during operation of said mower, means for rotatably and shiftably mounting said roller on said frame structure including a pair of hub elements, one associated with each end of said roller respectively and each shiftably and rotatably mounted on said frame structure, each hub element having an outwardly extending flange provided with a cam surface, means including a member positively connected with each of said hub elements for simultaneously rotating said hub elements relative to said frame structure, and abutments on said frame structure engageable with said cam surfaces for positively predetermining the position of said roller relative to said frame structure, one of said abutments being rotatably mounted on said frame structure and having a cam surface engageable with the cam surface of the associated hub element for predetermining the position of one end of said roller relative to said frame structure independently of the other end of said roller.

8. In a lawn mower including a frame structure and spaced means on said frame structure for translatably supporting said mower and having continuously driven cutting apparatus located between said means; apparatus for releasably supporting said mower in inoperative position during continuous operation of said cutting means including a rest pivotally mounted on said frame structure adjacent one of said supporting means including a portion rotatable into downwardly protruding relationship with respect to the lowermost part of said adjacent supporting means for maintaining said cutting apparatus in an elevated inoperative position, and a resilient member interposed between and connected to said rest and frame structure respectively for normally retaining said rest in an inoperative position, said rest being releasable from its operative position by movement of said mower in one direction of its normal course of movement.

9. In a lawn mower including a frame structure and having means on said frame structure for translatably supporting the latter; cutting apparatus including a cutting reel rotatably mounted on said frame structure, a knife bed extending between and fixed to opposite sides of said frame structure and having a surface on its upper side provided with an arcuate transverse curvature and located in related proximity to said cutting reel, and a knife detachably secured to said bed superimposed on said surface and supported throughout its entire length thereby, said knife having an arcuate transverse curvature conforming with the curvature of said surface and supported thereby and by said knife bed against longitudinal deflection by the action of said cutting reel.

10. In a lawn mower including a frame structure and having means on said frame structure for translatably supporting the latter; cutting apparatus including a cutting reel rotatably mounted on said frame structure, a knife bed extending between and fixed to opposite sides of said frame structure and having a surface on its upper side provided with an arcuate transverse curvature and located in related proximity to said cutting reel, and a knife blade detachably secured to said bed superimposed on said surface and supported substantially throughout its entire length thereby and fixed to said frame structure, said knife having an arcuate transverse curvature conforming with the curvature of said surface and supported thereby and by said knife bed against longitudinal deflection by the action of said cutting reel and having cutting edges along both of its lateral extremities.

11. A lawn mower including a frame structure, rotatable means located at the rear of said frame structure for translatably supporting the rear end portion thereof and so constructed and arranged as to sustain the main portion of the weight of said mower, means located at the front of said frame structure for translatably supporting and sustaining the remaining portion of the weight of said mower, cutting apparatus operatively mounted on said frame structure between said means, driving mechanism for said cutting apparatus so mounted on said frame structure as to apply the main portion of its weight on said rear supporting means and to predetermine the downward pressure applied by said front supporting means on the grass immediately in advance of said cutting apparatus, and means for manually propelling said lawn mower comprising a handle element having a normal operating position extending rearwardly and upwardly at an inclination from said frame structure and including a hand grip element at its upper end and an attaching member at its lower end pivotally connected to said frame structure at a location rearwardly of the axis of said rotative rear supporting means and so constructed and arranged as to accommodate rotation of said handle upwardly from its normal operating position under the influence of upwardly directed components of manually applied propelling forces so applied as to tend to urge said front supporting means downwardly.

12. A lawn mower including a frame structure, a main roller mounted on the rear end portion of said frame structure, cutting apparatus in advance of said main roller, a guide roller in front of said cutting apparatus for predetermining the effective elevation of the latter from the ground surface, and a propelling handle extending upwardly and rearwardly to an inclination to said surface and including a hand grip element and an attaching member pivotally connected to said frame structure at a location rearwardly of the axis of said rear roller, and so constructed and arranged as to accommodate rotation of said handle upwardly from its normal operating position under the influence of upwardly directed components of improperly applied propelling forces so applied as to tend to urge said front roller downwardly.

13. A lawn mower including a frame structure, a main roller mounted on the rear end portion of said frame structure, cutting apparatus in advance of said main roller, a guide roller in front of said cutting apparatus for predetermining the effective elevation of the latter from the ground surface, a propelling handle extending upwardly and rearwardly at an inclination of said surface and including a hand grip element at the upper end and an attaching member pivotally connected to said frame structure at a location rearwardly of the axis of said rear roller and so constructed and arranged as to accommodate rotation of said handle upwardly from its normal operating position under the influence of upwardly directed components of improperly applied propelling forces so applied as to tend to urge said front roller downwardly, and means for limiting rotation of said handle in an opposite direction to a position such that normally applied propelling forces would tend to tilt said mower about said rear roller and lift said front roller upwardly.

14. In a lawn mower comprising a frame structure and having a knife fixed thereon; adjustable cutting mechanism including a cutting reel, reel supporting members adjustably mounted in said frame structure for rotatably supporting the respectively opposite end portions of said reel and shiftably supporting the latter for movement toward and away from said knife, and means for simultaneously uniformly moving both end portions of said reel and all parts thereof between said end portions with respect to said knife including a reel supporting member adjusting element for operating upon each reel supporting member respectively and a manually manipulatable part positively connecting said elements for actuating the latter in unison.

15. In a lawn mower comprising a frame structure having opposite side portions and having a knife member secured thereto; adjustable cutting mechanism including a cutting reel, reel supporting members having a cylindrical portion journalled in openings in said frame side members and having journal portions eccentric with respect to the axis of said cylindrical portion for rotatably supporting opposite end portions of said reel and for shiftably supporting the latter for movement toward and away from said knife member, each of said reel supporting members having a gear segment thereon, means for simultaneously uniformly moving both end portions of said reel and all parts thereof between said end portions with respect to said knife member including a pinion meshed with the teeth of each gear segment respectively and a common manually rotatable supporting and operating shaft for said pinions, said shaft being non-rotatably connected with each of said pinions for rotating the latter and each of said reel supporting elements in unison, and means for releasably holding said reel supporting members in a selected adjusted position.

HIRAM F. GODWIN.
FRANK C. SPEKE.